(12) United States Patent
Carton et al.

(10) Patent No.: US 8,371,179 B2
(45) Date of Patent: Feb. 12, 2013

(54) MEASUREMENT ARRANGEMENT (75) Inventors: Georg Carton, Whiteland, IN (US); Rob Vermeulen, Greenwood, IN (US)

(73) Assignee: Endress + Hauser GmbH + Co., KG, Maulburg (DE)

( * ) Notice: Subject to any disclaimer, the term of this patent is extended or adjusted under 35 U.S.C. 154(b) by 307 days.

(21) Appl. No.: 12/923,814

(22) Filed: Oct. 8, 2010

(65) Prior Publication Data
US 2012/0085180 A1 Apr. 12, 2012

(51) Int. Cl.
*G01N 1/12* (2006.01)
(52) U.S. Cl. .................... 73/862.59; 73/714; 73/756
(58) Field of Classification Search .............. 73/700, 73/714, 756, 862.59
See application file for complete search history.

(56) References Cited

U.S. PATENT DOCUMENTS

| | | | | |
|---|---|---|---|---|
| 4,543,044 A * | 9/1985 | Simmons | ...................... | 417/342 |
| 5,705,737 A * | 1/1998 | Liao | .............................. | 73/49.7 |
| 6,135,916 A * | 10/2000 | Vorndran et al. | ............... | 477/48 |
| 6,223,533 B1 * | 5/2001 | Schlaupitz | ....................... | 60/555 |
| 6,805,671 B2 * | 10/2004 | Stergiopoulos et al. | ...... | 600/493 |
| 2011/0154912 A1 * | 6/2011 | Kumar et al. | .............. | 73/861.19 |

* cited by examiner

*Primary Examiner* — Max Noori
(74) *Attorney, Agent, or Firm* — Bacon & Thomas, PLLC (57) ABSTRACT A measurement arrangement for measuring and/or monitoring a physical property, comprising a measurement device comprising: at least one primary sensing element to be exposed to a product at a measurement site, a remotely located secondary measurement device, and transmission lines connecting said primary sensing elements to said secondary measuring device, suitable for applications wherein the primary sensing elements may be exposed to strong vibrations at the measurement sites, is described, wherein said secondary measurement device is mounted above all primary sensing elements and wherein said transmission lines comprise an inner core, an outer tubular protection conduit enclosing said core, and a vibration absorbing medium filling an interior of said outer protection conduit surrounding said inner core.

11 Claims, 6 Drawing Sheets

MEASUREMENT ARRANGEMENT

BACKGROUND AND SUMMARY OF THE INVENTION

The present invention concerns a measurement arrangement for measuring and/or monitoring a physical property, comprising: a measurement device comprising: at least one primary sensing element to be exposed to a product at a measurement site, mounting means for mounting said primary sensing elements at said measurement sites, a secondary measuring device, mounting means for mounting said secondary measurement device, and transmission lines connecting each primary sensing element to said secondary measurement device.

Measurement devices for measuring and/or monitoring physical properties form the bases of modern process automation and are widely used in nearly all fields of industry for measuring, monitoring and/or controlling process parameters.

There is a large number of applications, where rough conditions prevail at the measurement site. This is for example the case, when the measurement site is exposed to high temperatures, or when physical properties of highly corrosive or abrasive process media are to be measured. Since not all components of the measurement device are able to withstand these conditions, measurement devices are used comprising primary sensing elements, which are mounted directly at the measurement sites, and are connected to a remotely located secondary measurement device via transmission lines. Thus the secondary measurement device can now comprises all those components of the measurement device, which are unable to withstand the conditions prevailing at the measurement site.

One example for corresponding measurement arrangements are pressure measurement arrangements comprising diaphragm seals as primary sensing elements. Diaphragm seals comprise a membrane to be exposed to the pressure at the measurement site, and are connected to a remotely located secondary pressure measurement device, e.g. a pressure transmitter comprising a sensor and corresponding measurement electronics, via capillary tubes. Diaphragm seals are not only used in harsh environments, but also in applications wherein good and rapid cleaning of the measurement site is required.

Other examples are applications wherein the primary sensing elements are sensors, detectors, antennas, transducers or probes, which are connected to secondary measuring devices comprising for example sensitive measurement electronics, via purely electric transmission lines, like for example uni- or bidirectional signal transmission lines or power supply lines.

The transmission lines normally comprise an inner core, e.g. an inner pressure transmitting capillary, or one or more cables or lines, and an outer tubular protection conduit enclosing said core, and are directly connected to the primary sensing elements.

When the primary sensing elements are used in applications, where they are subjected to strong vibrations at the measurement site, this vibration will affect the end section of the transmission line connected to the primary sensing element. At the same time, the other end of the transmission line connected to the secondary measuring device will remain essentially motionless due to the remote location of the secondary measuring device. In the long run, the resulting strain on the transmission line may cause the core therein and sometimes also its tubular protection conduit to break close to the primary sensing element.

It is an object of the invention to provide a measurement arrangement comprising at least one primary sensing element, a remotely located secondary measurement device, and transmission lines connecting each primary sensing element to the secondary measuring device, for applications wherein the primary sensing elements may be exposed to strong vibrations at the measurement sites.

To this extend the invention comprises a measurement arrangement for measuring and/or monitoring a physical property, comprising a measurement device comprising:
  at least one primary sensing element to be exposed to a product at a measurement site,
  mounting means for mounting said primary sensing elements at said measurement sites,
  a secondary measuring device,
  mounting means for mounting said secondary measurement device above said measurement sites,
  transmission lines connecting each primary sensing element to said secondary measurement device, said transmission lines comprising:
    an inner core,
    an outer tubular protection conduit enclosing said core, and
    a vibration absorbing medium filling an interior of said outer protection conduit surrounding said inner core.

According to a preferred embodiment, the vibration absorbing medium is a powder, in particular an aluminum oxide powder, a liquid, or a gel, in particular a silica gel.

The invention further comprises a measurement arrangement according to the invention, comprising a single primary measurement element, wherein
  said physical property is a pressure of a product at a single measurement site,
  said primary sensing element is a diaphragm seal,
    said diaphragm seal comprising a membrane to be exposed to said pressure at said measurement site,
  said secondary measuring device is a pressure measurement device, and
  said transmission line is a capillary tube,
  said inner core is a capillary inside said capillary tube, and
  a pressure transferring liquid is foreseen, filling an inside of said diaphragm seal and said capillary for transferring said pressure onto said pressure measuring device.

The invention further comprises a measurement arrangement according to the invention, comprising a first and a second primary measurement element, wherein
  said physical property is a differential pressure between a first pressure at a first measurement site and a second pressure at a second measurement site,
  said first primary sensing element is a first diaphragm seal comprising a membrane to be exposed to said first pressure at said first measurement site,
  said second primary sensing element is a second diaphragm seal comprising a membrane to be exposed to said second pressure at said second measurement site,
  said secondary measuring device is a differential pressure measurement device,
  said transmission lines are capillary tubes,
  said inner cores are capillaries inside said capillary tubes, and
  a pressure transferring liquid is foreseen, filling an inside of said first and said second diaphragm seal and said capillaries for transferring said first and said second pressure onto said differential pressure measuring device.

The invention further comprises a measurement arrangement according to the invention, wherein:

said primary sensing element comprises a sensor, a detector, an antenna, a transducer, or a probe, said secondary measuring device comprises a measurement electronics, and said inner core of said transmission line comprises at least one cable or line for electrically connecting said primary sensing element to said secondary measurement device.

According to a refinement of said last mentioned arrangement said primary sensing element comprises an extension enclosing an electric connector for electrically connecting said primary sensing element to at least one cable or line of said core of said transmission line.

According to a further refinement, an end of said outer conduit is equipped with a sleeve nut, which is screwed onto an outer thread of said tubular extension.

According to further embodiments of said last mentioned arrangement, said measurement device is a level measurement device for measuring a level of a product in a container, in particular a time of flight microwave level measurement device comprising an antenna, a guided radar time of flight level measurement device comprising a conductive probe, a capacitance level measurement device comprising a capacitance probe, or an ultrasonic level measurement device comprising an ultrasonic transducer.

According to another embodiment of said last mentioned arrangement, said measurement device is a level switch for monitoring a predetermined level of said product in a container, and said primary sensing element comprises a mechanically oscillating structure extending into said container at a height corresponding to said level to be monitored, and an electromechanical transducer for causing said structure to oscillate and for transforming a resulting oscillation of said structure into an electric measurement signal.

The invention and its advantages are explained in more detail using the figures of the drawing, in which seven exemplary embodiments are shown. The same reference numerals refer to the same elements throughout the figures.

DETAILED DESCRIPTION OF THE DRAWINGS

Figure 1:
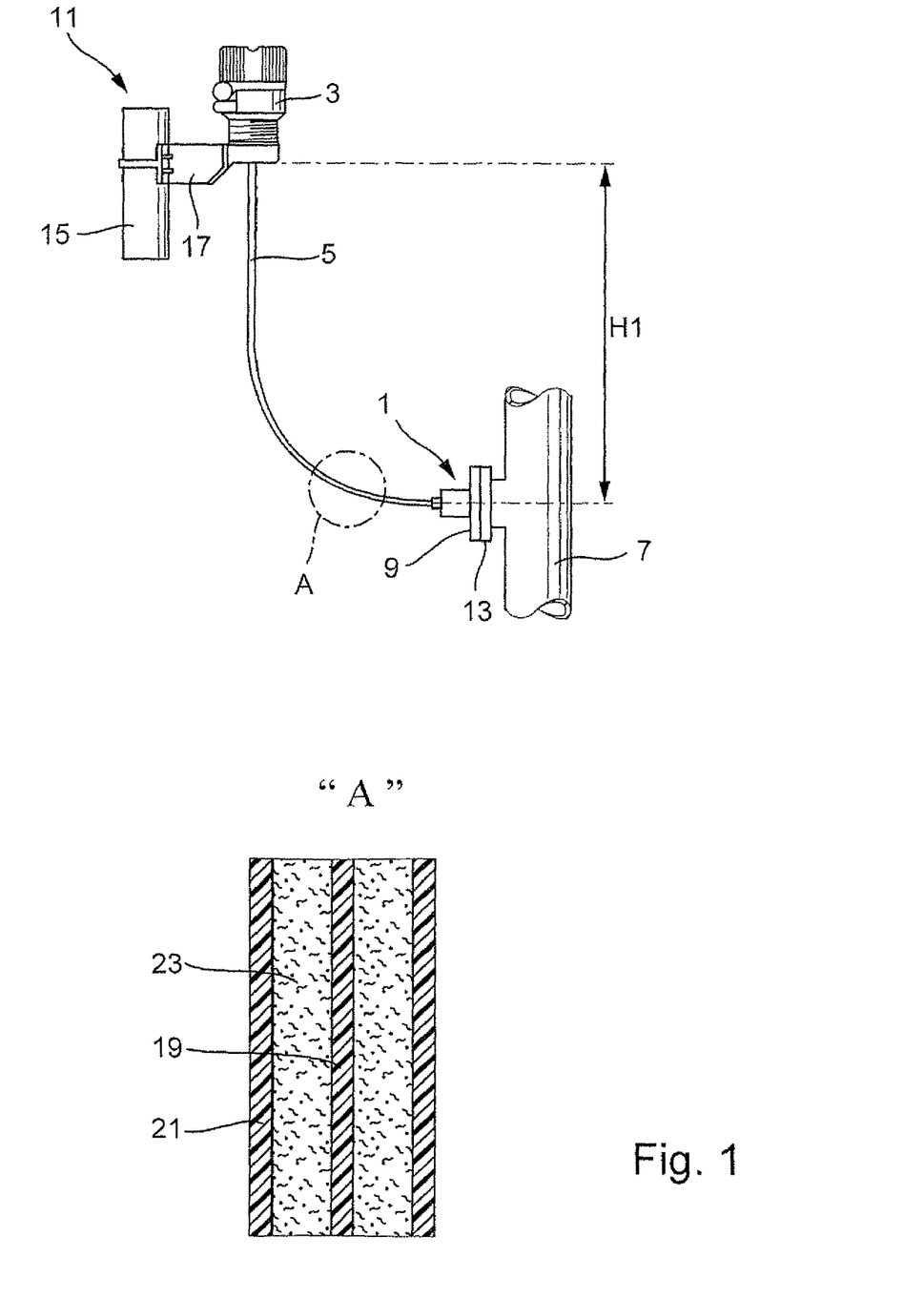
FIG. 1 shows: a general set up of a measurement arrangement according to the invention.

FIG. 1 shows a general set-up of a measurement arrangement according to the invention. Central element of the arrangement is a measurement device for measuring a physical property, which comprises at least one primary sensing element 1, a secondary measurement device 3, and transmission lines 5, connecting each primary sensing element 1 to the secondary measurement device 3.

Depending on the measurement device, the physical property to be measured, and the underlying measurement principle, the primary sensing elements 1 can for example comprise sensors, detectors, measurement probes, antennas, transducers or diaphragm seals, and the secondary measurement devices 3 can for example be corresponding measurement transmitters or measurement electronics.

Each primary sensing element 1 is mounted onto a measurement site 7 via suitable mounting means 9, and mounting means 11 are foreseen for mounting the secondary measurement device 3 at a remote location above all primary sensing elements 1.

In the embodiment shown in FIG. 1 only one primary sensing element 1 is shown. Depending on the type of measurement device used and the physical property to be measured, two or more primary sensing elements can be foreseen at a corresponding number of measurement sites and connected to the secondary measurement device via a corresponding number of transmission lines.

The measurement sites 7 are for example pipes—as shown in FIG. 1—, containers or other types of vessels. The mounting means 9 for mounting the primary sensing elements 1 are for example standard process connectors, e.g. flanges, used in industry, which are mounted onto corresponding counter connectors 13 at the respective measurement sites 7.

The mounting means 11 mounting the secondary measurement device 3 can be any type of mounting means suitable for mounting the secondary measurement device 3 above all the primary sensing elements 1 connected thereto. Since the position of the measurement site 7 is normally predetermined by the application in which the arrangement is used, the difference in height H1 between the secondary measurement device 3 and the primary sensing elements 1 connected thereto is established by the height at which the secondary measurement device 3 is mounted above the measurement sites 7. In the embodiment shown in FIG. 1 the mounting means 11 comprise a holder 15, which is attached to a wall 17 above the measurement site 7, resulting in a difference in height H1 between the secondary measurement device 3 and the primary sensing element 1.

As shown in the enlarged cross sectional view of transmission line segment A in FIG. 1, the transmission lines 5 comprise an inner core 19 and an outer tubular protection conduit 21 enclosing said core 19.

The transmission lines 5 are preferably flexible lines. Depending on the type of measurement device and the underlying measurement principle used in the application, various types of transmission lines 5, e.g. hydraulic transmission lines or electric transmission lines, can be used.

According to the invention a vibration absorbing medium 23 is foreseen filling an interior of the outer protection conduit 21 surrounding the inner core 19.

The vibration absorbing medium 23 is preferably a gel, in particular a silica gel, a liquid, in particular an oil, or a powder, preferably a fine powder, in particular an aluminum oxide powder.

Due to the fact, that the secondary measurement device 3 is mounted above the primary sensing elements 1, the vibration absorbing medium 23 will settle at the bottom end of the transmission line 5, and provide a mechanical coupling between the inner core 19 an its protection conduit 21. The vibration absorbing medium 23 thus dampens any movement of the inner core 19 relative to its enclosure, formed by the outer protection conduit 21.

As a result, when the primary sensing element 1 is subjected to strong vibrations at the measurement site 7, the inner core 19 inside the protection conduit 21 will no longer move and swing as heavily, relative to its enclosure, as it would do in the absence of the vibration absorbing medium 23.

As a consequence the end section of the inner core 19 connected to the primary sensing element 1 and its connection to the primary sensing element 1 are exposed to significantly less mechanical stress and strain.

In addition, the vibration absorbing medium 23 stiffens the flexible protection conduit 21 in the vicinity of the primary sensing element 1, and thus reduces vibration induced movements of the protection conduit 21 at and near its connection to the primary sensing element 1, and prevents the protection conduit 21 from swinging.

Since the secondary measurement device 3 is mounted above the primary sensing element 1 the vibration absorbing medium 23 will settle inside the end of the protection conduit 21 connected to the primary sensing element 1. Thus it concentrates at the vibration source, which is exactly the place where it is most needed.

The invention can for example be used in pressure measurement arrangements for measuring a pressure p of a product at measurement site 7. In that case the primary sensing element 1 is a diaphragm seal 1a, the secondary measuring device 3 is a pressure measurement device, e.g. a pressure transmitter comprising a pressure sensor and corresponding measurement electronics, and the transmission line 5 is a capillary tube 5a.

Figure 2:
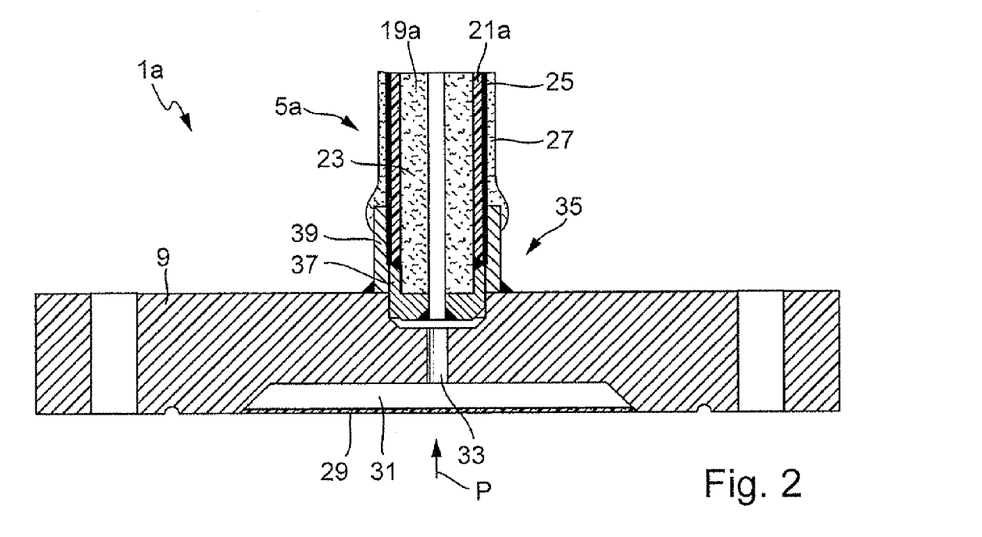
FIG. 2 shows a cross sectional view of a diaphragm seal and a section of a capillary tube connected thereto of a pressure measurement arrangement.

FIG. 2 shows a corresponding diaphragm seal 1a and a segment of the capillary tube 5a connected to the diaphragm seal 1a for connecting the diaphragm seal 1a to the pressure measurement device.

The inner core 19 of the capillary tube 5a is a capillary 19a, and the protection conduit 21 is a protection hose 21a. The capillary 19a is for example a flexible metal tube out of copper or steel. The protection hose 21a is preferably a flexible metal tube, for example a stainless steel tube, extending over the entire length of the capillary 19a. Depending on safety, hygiene or other regulations and/or requirements at the measurement site 7 the flexible tube can be equipped with an additional protective coating armour 25, e.g. a polyvinyl chloride (PVC) or a polytetrafluoroethylene (PTFE) armour, and/or a shrink wrap 27, e.g. a polyvinyl chloride (PVC) or a polytetrafluoroethylene (PTFE) based shrink wrap, on its outside.

The diaphragm seal 1a comprises a membrane 29 closing a pressure reception chamber 31 inside the diaphragm seal 1a and a capillary bore 33 extending through the diaphragm seal 1a and connecting the pressure reception chamber 31 to the capillary 19a inside the capillary tube 5a.

The capillary tube 5a is for example connected to the diaphragm seal 1a via a connector 35 comprising an inner coupling 37 and an outer reinforcement 39. The inner coupling 37 is an essentially cylindrical element comprising a base with a central bore for the reception of an end of the capillary 19a. The end section of the capillary 19a extends into the central bore and is e.g. soldered or welded onto the coupling 37. The protection hose 21a is e.g. soldered or welded onto a ring-cylindrical surface of the coupling 37 facing away from its base. The outer reinforcement 39 is preferably a rigid metal tube, which is slid over the connection between the coupling 37 and the protection hose 21a and soldered or welded onto the coupling 37 and the protection hose 21a.

An end section of the coupling 37 extending through the reinforcement 39 is inserted into an opening on the rear surface of the diaphragm seal 1a facing away from its membrane 29 leading into the capillary bore 33, and the reinforcement 39 is welded onto the rear surface of the diaphragm seal 1a The capillary 19a and an interior of the diaphragm seal 1a, here the pressure reception chamber 31 and the capillary bore 33, are filled with a pressure transferring liquid, e.g. a silicon oil. In operation, the membrane 29 is exposed to the pressure p to be measured, which is then transferred onto the pressure sensor inside the pressure measurement device 3 by the pressure transferring liquid.

In order to expose the membrane 29 to the pressure p to be measured, mounting means 9 for mounting the diaphragm seal 1a onto the measurement site 7 are foreseen. The mounting means 9 can for example be a standard process connector, e.g. a flange—as shown in FIG. 2—, exposing the membrane 29, which is mounted onto a corresponding counter connector 13, here a counter flange, at the measurement site 7.

The vibration absorbing medium 23 fills an interior of the capillary tube 5a surrounding the inner capillary 19a.

Due to the fact, that the pressure measurement device 3 is mounted above the diaphragm seal 1a, the vibration absorbing medium 23 will settle at the bottom end of the capillary tube 5a, and provide a mechanical coupling between the capillary 19a an its protection hose 21a. The vibration absorbing medium 23 thus dampens any movement of the capillary 19a relative to its enclosure, here formed by the coupling 37, the protection hose 21a and the reinforcement 39.

As a result, when the diaphragm seal 1a is subjected to strong vibrations at the measurement site 7, the capillary 19a inside the capillary tube 5a will no longer move and swing as heavily, relative to its enclosure, as it would do in the absence of the vibration absorbing medium 23.

As a consequence the end section of the capillary 19a connected to the diaphragm seal 1a and its connection to the coupling 37 are exposed to significantly less mechanical stress and strain.

In addition, the vibration absorbing medium 23 stiffens the flexible protection hose 21a in the vicinity of the diaphragm seal 1a, and thus reduces vibration induced movements of the protection hose 21a at and near its connection to the diaphragms seal 1a, and prevents the protection hose 21a from swinging.

Obviously, the invention is not limited to measurement arrangements designed for measuring a single pressure. It can be used in the same way in any type of arrangement, where two or more diaphragm seals are connected to at least one pressure measurement device via a capillary tube, wherein mounting means are foreseen, for mounting the pressure measurement devices above all diaphragm seals connected thereto.

Figure 3:
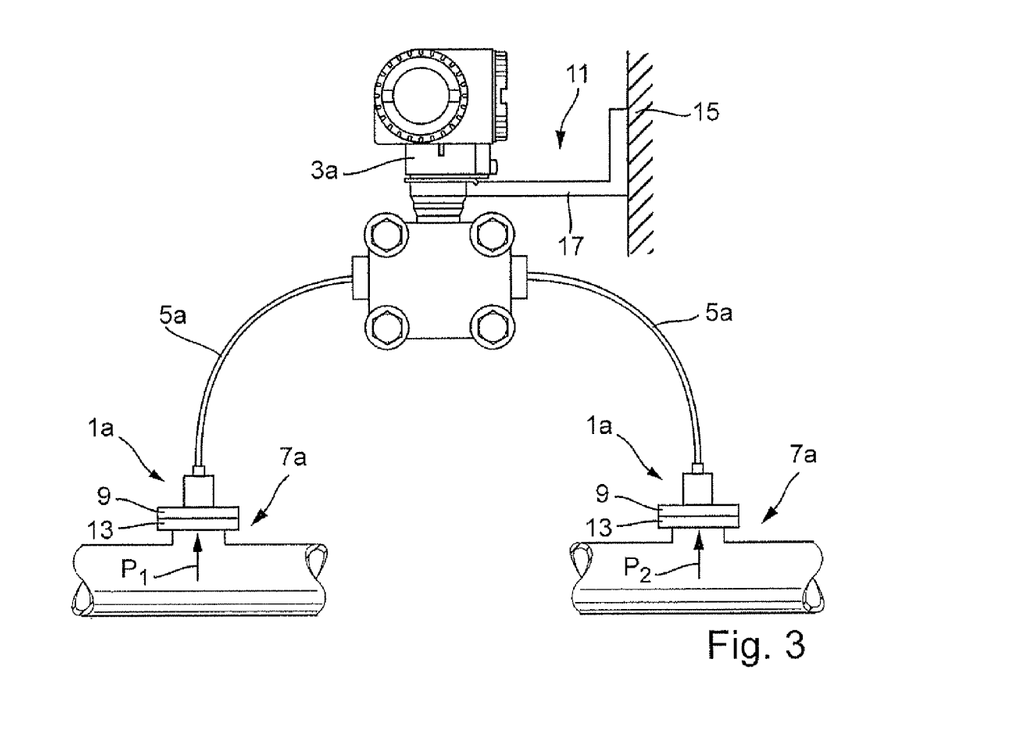
FIG. 3 shows a differential pressure measurement arrangement.

In particular the invention can be used in differential pressure measurement arrangements for measuring a differential pressure, as shown in FIG. 3. The differential pressure to be measured is for example a difference in pressure between a first pressure p1 at a first measurement site 7a and a second pressure p2 at a second measurement site 7b.

Arrangements like this are for example used for determining a flow through a pipe. In that case a flow resistance, e.g. an orifice or a nozzle—not shown here—is inserted in the pipe between the first and the second measurement site 7a, and the resulting flow dependent pressure drop across the resistance is measured.

In this arrangement the secondary measurement device 3 is a differential pressure measurement device 3a, e.g. a differential pressure transmitter comprising a differential pressure sensor. Mounting means 11 are foreseen, for mounting the differential pressure measurement device 3a above the first and above the second measurement site 7a. Like in the embodiment shown in FIG. 1, the mounting means 11 can for example comprise a holder 17, which is attached to a wall 15 above the measurement sites 7a. The arrangement further comprises two primary sensing elements 1, here a first and a second diaphragm seal 1a, and mounting means 9 for mounting the diaphragm seals 1a at the measurement sites 7a. The first and the second measurement site 7a do not have to be located on the same height, as long as they are both located below the differential pressure measurement device 3a. The diaphragm seals 1a and their mounting means 9 can for example be identical to the diaphragm seal 1a and the mounting means 9 shown in FIG. 1.

Two transmission lines 5 are foreseen, for connecting the first diaphragm seal 1a to the differential pressure measurement device 3a and for connecting the second diaphragm seal 1a to the differential pressure measurement device 3a. Again, the transmission lines 5 are capillary tubes 5a, which can be identical to the capillary tube 5a described above. Thus each capillary tube 5a comprises a protection hose 21a, enclosing a capillary 19a, and the vibration absorbing medium 23 is foreseen, filling an interior of each of the capillary tubes 5a surrounding the capillary 19a located therein.

Like in the previously described embodiment, a pressure transferring liquid is foreseen, filling an inside of the first diaphragm seal 1a and the capillary 19a of capillary tube 5a for transferring the first pressure p1 onto the differential pressure measurement device 3a, and filling an inside of the second diaphragm seal 1a and the capillary 19a of the second capillary tube 5a for transferring the second pressure p2 onto the differential pressure measurement device 3a.

Another wide field wherein the invention can be used are measurement arrangements, wherein one or more primary sensing elements 1 comprising e.g. a sensor, an antenna, a transducer or a probe are electrically connected to a remote secondary measurement device 3 by electric transmission lines 5, like for example uni- or bidirectional signal transmission lines or power supply lines. In that case, the inner cores 19 of the transmission lines comprise at least one cable or line for electrically connecting the primary sensing elements 1 to the secondary measurement device 3. This type of primary sensing elements 1 is preferably equipped with a tubular extension housing electrical connectors for electrically connecting the connection leads of the primary sensing element 1 to the corresponding cables or lines of the core 19 of the electric transmission line 5, and mounting means are foreseen, for mounting the outer protection conduit 21 onto the tubular extension.

Such arrangements are for example used for measuring a level of a product 41 in a container. In these embodiments the measurement sites 7 are containers 7b comprising the product 41.

Figure 4:
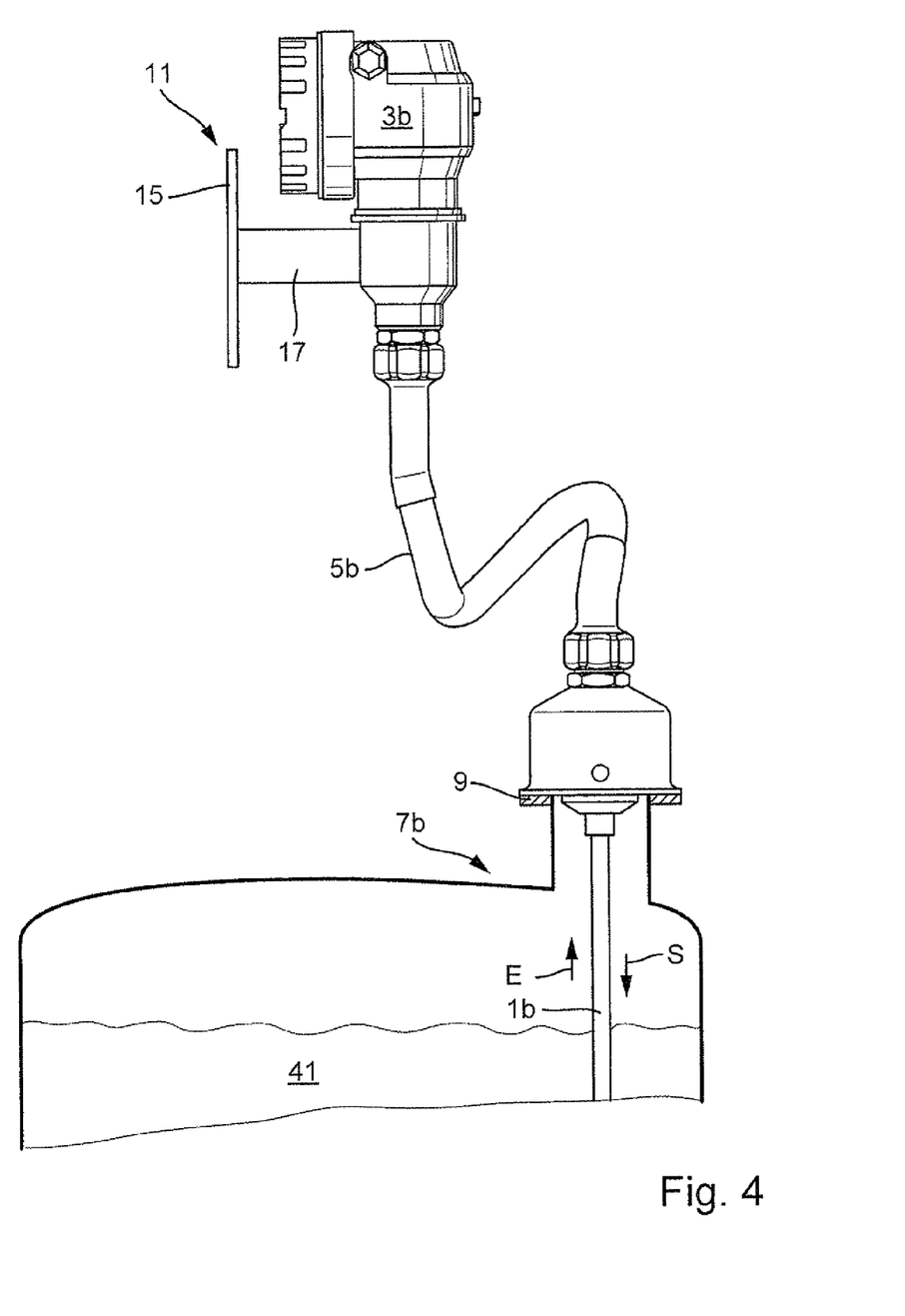
FIG. 4 shows: a guided radar time of flight level measurement arrangement comprising a conductive probe and a time of flight level measurement device.

FIG. 4 shows an embodiment, wherein the measurement device is a guided radar time of flight level measurement device. Such devices are for example the Guided Radar Transmitters Levelflex FMP 40, sold by the applicant.

In this embodiment the primary sensing element 1 comprises a conductive probe 1b and is mounted onto a tubular stud enclosing an opening on the top of the container 7b using standard mounting means 9, such that the probe 1b extends into the container 7b. The secondary measurement device 3 is a level measurement device 3b comprising means for generating short electromagnetic pulses S which are transferred onto the probe 1b via the electric transmission line 5b. The pulses S travel down the probe 1b and are reflected at a surface of the product 41 inside the container 7b. The secondary level measurement device 3b further comprises means for receiving the corresponding echo signals E caused by the reflection of the pulses S at the surface of the product 41, which are transferred to the level measurement device 3b via the transmission line 5b, and means for determining the level of the product 41 based on a measurement of a time of flight needed for a pulse S to travel down the probe 1b and its echo signal E to return.

In order to transmit the electromagnetic pulses E from the secondary level measurement device 3b to the probe 1b and their corresponding echo signals E from the probe 1b to the secondary level measurement device 3b, the inner core 19 of the transmission line 5b is a coaxial cable 19b, which is enclosed in an outer preferably flexible protection conduit 21b.

Figure 5:
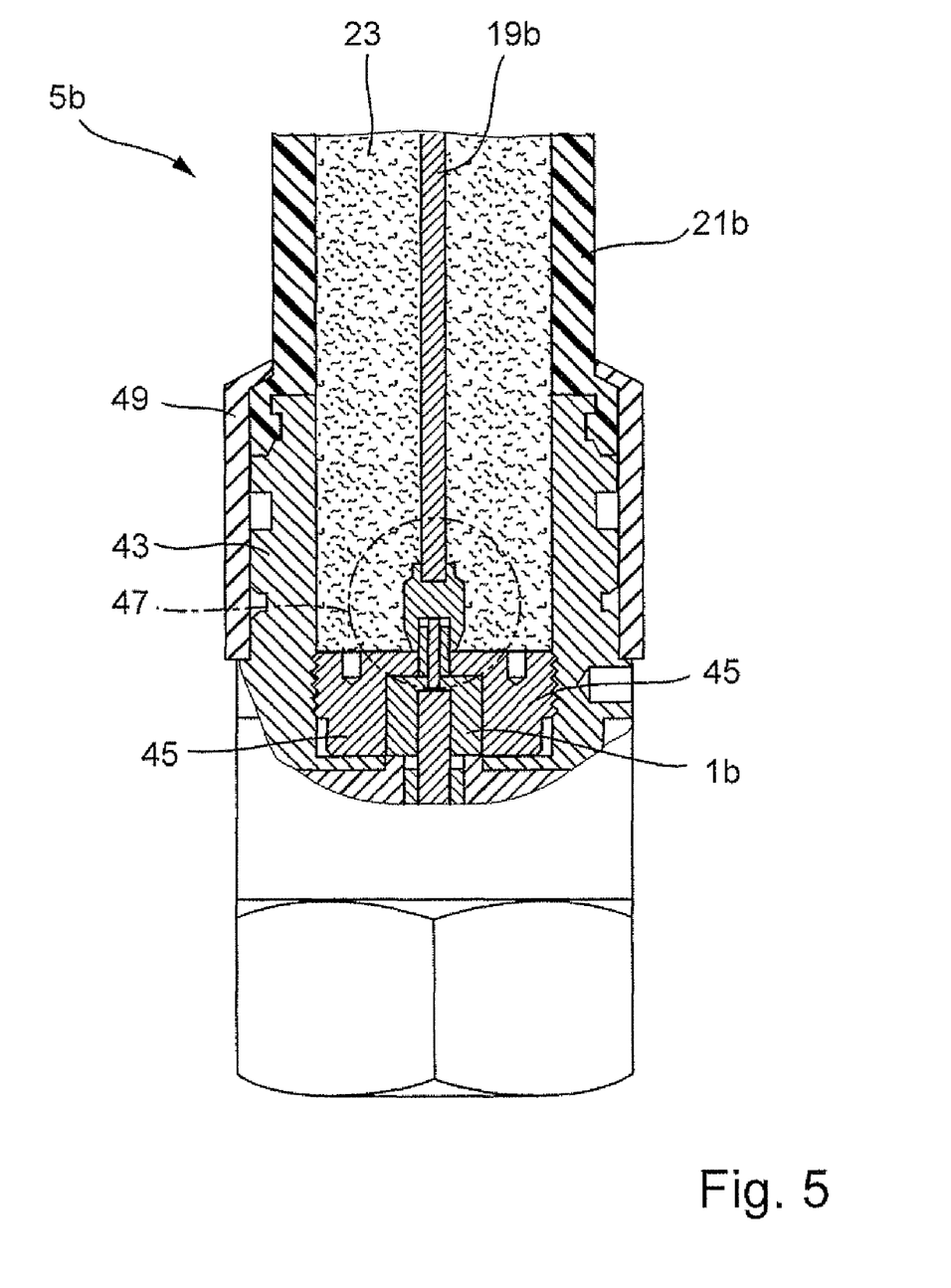
FIG. 5 shows a partially cross sectional view of the connection between the probe and the transmission line of FIG. 4.

FIG. 5 shows an end section of the transmission line 5b and its connection to the probe 1b. An end section of the conductive probe 1b extends through the mounting means 9 into a tubular extension 43 of the primary sensing element 1, and is held in place inside the extension 43 by a dielectric insert 45 isolating the probe 1b from the tubular extension 43. Inside the tubular extension 43 a radio frequency connector 47, e.g. a SMA connector, is foreseen connecting the coaxial cable 19b to the end of the probe 1b. In this embodiment the end of the outer conduit 21b is equipped with a sleeve nut 49, which is screwed onto an outer thread of the tubular extension 43.

According to the invention an interior of the outer protection conduit 21 surrounding the coaxial cable 19b is filled with the vibration absorbing medium 23, resulting in the previously described advantages.

Whilst in this embodiment, there is only a single coaxial cable needed inside the transmission line, the invention is not limited to single cable transmission lines. It can be applied in the same way in applications, wherein the inner core 19 of the transmission line 5 comprises two or more cables. Also various different types of cables, e.g. ranging from simple insulated copper conductors to radio frequency cables, can be used.

Figure 6:
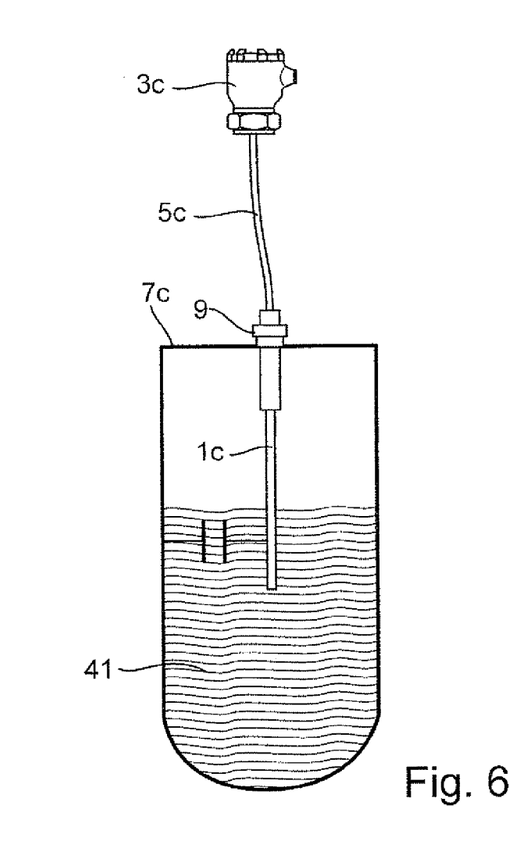
FIG. 6 shows: a capacitance level measurement arrangement.
Figure 7:
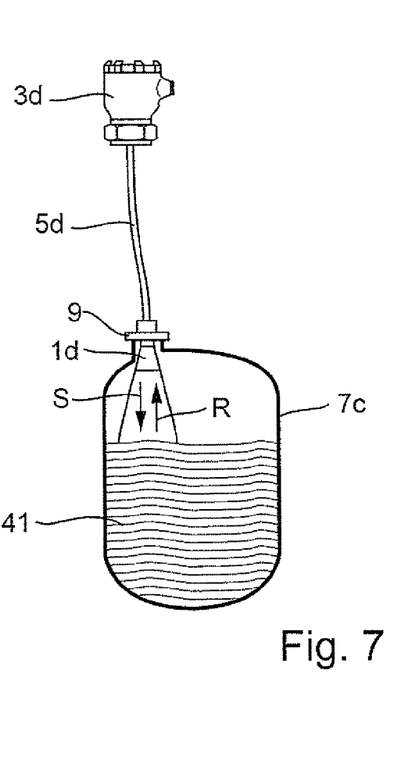
FIG. 7 shows: a microwave level measurement arrangement.
Figure 8:
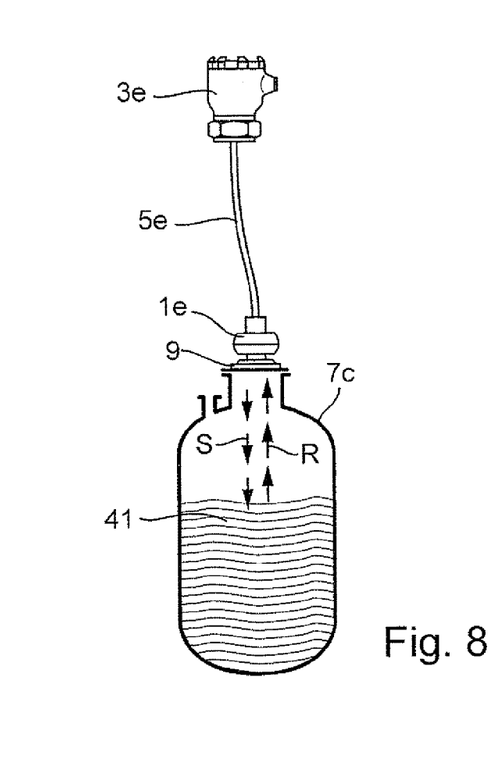
FIG. 8 shows: an ultrasonic level measurement arrangement.

Other embodiments, wherein the invention can be applied are for example capacitive level measurement arrangements, as shown in FIG. 6, microwave level measurement arrangements, as shown in FIG. 7 or ultrasonic level measurement arrangements, as shown in FIG. 8.

In the capacitive level measurement arrangement shown in FIG. 6, a radio frequency is be applied to a capacitance probe 1c extending into the container 7c and a level dependant capacitance C between the probe and the container 7c is measured. The primary sensing element 1 comprises the capacitance probe 1c extending into the container 7c, and the secondary measurement device 3 is a capacitive level measurement device 3c comprising means for generating the radio frequency to be supplied to the probe 1b and means for determining the level of the product 41 based on a measurement of the level dependant capacity C between the capacitance probe 1c and the container wall. Correspondingly electric transmission line 5c, comprises an inner core 19 suitable for transmitting the radio frequency and the resulting capacitance measurement signal. Transmission line 5c can be designed the same way, as shown in FIG. 5, using standard cable connectors for connecting the core cables to the probe 1c inside a tubular extension, and a shell nut for mounting the protection conduit 21 onto the extension.

In the microwave level measurement arrangement shown in FIG. 7, a microwave signal S, e.g. short microwave pulses or a frequency modulated continuous wave signal, is sent into the container 7c via an antenna 1d which is directed onto the surface of the product 41 inside the container 7c. The signal S is reflected at the surface of the product and the reflected signal R is received by the antenna 1d. A level dependant time of flight needed for the microwave signal S to travel to the surface and for its reflection R at the surface to return to the measurement device is measured.

In this case the primary sensing element 1 comprises the antenna 1d, which is mounted onto the container 7c above the product 41, and the secondary measurement device 3 is a microwave level measurement device 3d comprising means for generating the microwave signal S, for receiving the reflected signal R, and for determining the level based on a measurement of the time of flight needed for the signal S to travel to the surface of the product 41 and its reflection R to return.

Here electric transmission line 5d comprises an inner core 19 suitable for transmitting microwave signals, e.g. a coaxial cable. Transmission line 5d can be designed the same way, as shown in FIG. 5, using a standard connector for connecting the coaxial cable to the antenna 1d. Again the connection is preferably made inside a tubular extension at the rear of the antenna 1d, thus allowing the use of a shell nut for mounting the protection conduit 21 surrounding the coaxial cable onto the extension.

In the ultrasonic level measurement arrangement, an ultrasonic transducer 1e is mounted onto the container 7c above the product 41, and supplied with an excitation signal, which will cause the transducer 1e to generate and sent ultrasonic signals S, e.g. short ultrasonic pulses, into the container 7c towards the surface of the product 41. The ultrasonic signal S is reflected at the surface of the product and the reflection signal R is received via the ultrasonic transducer 1e, which transforms it into a corresponding electric measurement signal. A level dependant time of flight needed for the ultrasonic signal S to travel to the surface and for its reflection R at the surface to return to the measurement device is measured.

In this embodiment the primary sensing element 1 comprises the ultrasonic transducer 1e, which is mounted onto the container 7c above the product 41, and the secondary measurement device 3 is an ultrasonic level measurement device 1e comprising means for generating an excitation signal to be supplied to the transducer 1e, for receiving the measurement signal generated by the transducer 1e, and for determining the level of the product 41 inside the container 7c based on a measurement of the time of flight needed for the ultrasonic signal S to travel to the surface of the product 41 and its reflection R to return.

Correspondingly electric transmission line 5e comprises an inner core 19 suitable for transmitting the excitation signal and the measurement signal. Transmission line 5d can again be designed the same way, as shown in FIG. 5, using standard cable connectors for connecting the core cables to the transducer 1e inside a tubular extension 43, and a shell nut 49 for mounting the protection conduit 21 onto the extension.

Figure 9:
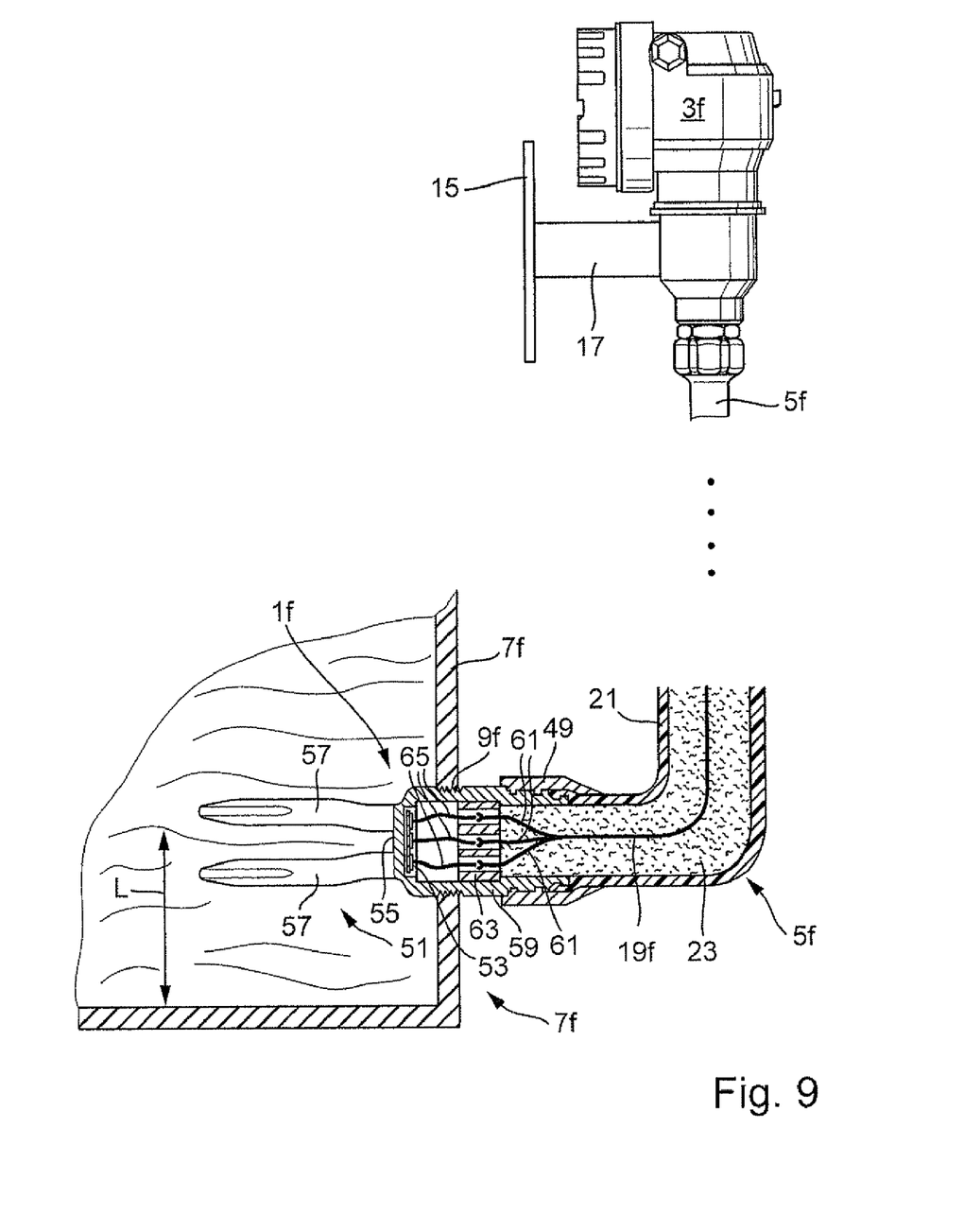
FIG. 9 shows: a partially cross sectional view of a level monitoring measurement arrangement.

In addition, the invention can also be applied in measurement arrangements as shown in FIG. 9, wherein a predetermined level L of a product in a container is monitored. In this arrangement the measurement device is a level switch comprising a primary sensing element 1f which is connected to a remote secondary measurement device 3, e.g. a corresponding switch electronic 3f, via an electric transmission line 5f. In the embodiment shown, the primary sensing element 1f comprises a mechanical oscillatory structure 51 and an electromechanical transducer 53 coupled thereto. The structure 51 comprises for example a membrane 55 with two mutually separated oscillation tunes 57 formed thereon, which extend into the container horizontally at the height of the predetermined level L to be monitored. To this extend mounting means 9, here an outer thread 9f on a cylindrical extension 59 of the structure 51 housing the transducer 53 at its base, are foreseen, for mounting the primary sensing element 1f at the measurement site 7f. The measurement site 7f is given by the height of the side wall of the container corresponding to the predetermined level L to be monitored. The transducer 53 is for example a piezoelectric transducer, which is mounted on a surface of the membrane 55 facing away from the tunes 57. The transducer 53 causes the structure to oscillate preferably at its resonance frequency based on an excitation signal supplied to it and transforms the resulting oscillation of the structure 51 into, an electric measurement signal. Thus amplitude and frequency of the measurement signal correspond to amplitude and frequency of the resulting oscillation. Since the oscillatory properties of the structure change dramatically depending on whether the structure is covered by the product or oscillating freely, the predetermined level L can be monitored based on the amplitude and/or frequency of the measurement signal. In this case the secondary measurement device 3 is for example a level switch electronic 3f comprising means for generating the excitation signal and means for monitoring the predetermined level based on the amplitude and/or frequency of the electric measurement signal.

The transmission line 5f connecting the primary sensing element 1f to the secondary measurement device 3f comprises an inner core 19f comprising excitation and measurement signal lines 61, e.g. in the form of insulated bundled copper cables. Inside the cylindrical extension 59 of the primary sensing element 1f, an insert 63 is foreseen comprising an electric connector for each line 61 of the core 19f for connecting the lines 61 to the corresponding connection leads 65 of the electromechanical transducer 53.

The protection conduit 21 enclosing the inner core 19f, can again be designed the same way, as shown in FIG. 5, using shell nut 49 for mounting the protection conduit 21 onto the extension 59.

Like in all other embodiments the vibration absorbing medium 23 is foreseen, filling an interior of the protection conduit 21 surrounding the inner core 19f, and the secondary measurement device 3f is mounted above the measurement site 7f, to ensure, that the vibration absorbing medium 23 settles inside the end of the protection conduit 21 connected to the primary sensing element 1f.

1 primary sensing element
1a diaphragm seal
3 secondary measurement device
5 transmission line
5a capillary tube
7 measurement site
9 mounting means for mounting a primary sensing element
11 mounting means for mounting the secondary measurement device
13 counter connector
15 holder
17 wall
19 inner core
19a capillary
19b coaxial cable
21 outer protection conduit
21a protection hose
23 vibration absorbing medium
25 coating armor
27 shrink wrap
29 membrane
31 pressure reception chamber
33 capillary bore
35 connector 37 inner coupling
39 outer reinforcement
41 product
43 tubular extension
45 dielectric insert
47 radio frequency connector
49 sleeve nut
51 mechanically oscillating structure
53 electromechanical transducer
55 membrane
57 tunes
59 cylindrical extension
61 excitation and measurement signal lines
63 insert comprising electric connectors
65 connection leads

What is claimed is:

1. A measurement arrangement for measuring and/or monitoring a physical property, comprising a measurement device comprising:
    at least one primary sensing element to be exposed to a product at a measurement site
    mounting means for mounting said primary sensing elements at said measurement sites,
    a secondary measuring device,
    mounting means for mounting said secondary measurement device above said measurement sites,
    transmission lines connecting each primary sensing element to said secondary measurement device, said transmission lines comprising:
        an inner core,
        an outer tubular protection conduit enclosing said core, and
        a vibration absorbing medium filling an interior of said outer protection conduit surrounding said inner core.

2. A measurement arrangement according to claim 1, wherein
    said vibration absorbing medium is a powder, a liquid, or a gel.

3. A measurement arrangement according to claim 1, wherein
    said vibration absorbing medium is an aluminum oxide powder.

4. A measurement arrangement according to claim 1, wherein
    said vibration absorbing medium is a silica gel.

5. A measurement arrangement according to claim 1, comprising
    a single primary measurement element, wherein
        said physical property is a pressure of a product at a single measurement site,
        said primary sensing element is a diaphragm seal,
            said diaphragm seal comprising a membrane to be exposed to said pressure at said measurement site,
        said secondary measuring device is a pressure measurement device, and
        said transmission line is a capillary tube,
        said inner core is a capillary inside said capillary tube, and
        a pressure transferring liquid is foreseen, filling an inside of said diaphragm seal and said capillary for transferring said pressure onto said pressure measuring device.

6. A measurement arrangement according to claim 1, comprising
    a first and a second primary measurement element wherein
        said physical property is a differential pressure between a first pressure at a first measurement site and a second pressure at a second measurement site,
        said first primary sensing element is a first diaphragm seal comprising a membrane to be exposed to said first pressure at said first measurement site,
        said second primary sensing element is a second diaphragm seal comprising a membrane to be exposed to said second pressure at said second measurement site,
        said secondary measuring device is a differential pressure measurement device,
        said transmission lines are capillary tubes,
        said inner cores are capillaries inside said capillary tubes, and
        a pressure transferring liquid is foreseen, filling an inside of said first and said second diaphragm seal and said capillaries for transferring said first and said second pressure onto said differential pressure measuring device.

7. A measurement arrangement according to claim 1, wherein:
    said primary sensing element comprises a sensor, a detector, an antenna, a transducer, or a probe,
    said secondary measuring device comprises a measurement electronics, and
    said inner core of said transmission line comprises at least one cable or line for electrically connecting said primary sensing element to said secondary measurement device.

8. A measurement arrangement according to claim 7, wherein:
    said primary sensing element comprises an extension enclosing an electric connector for electrically connecting said primary sensing element to at least one cable or line of said core of said transmission line.

9. A measurement arrangement according to claim 8, wherein:
    an end of said outer conduit is equipped with a sleeve nut, which is screwed onto an outer thread of said tubular extension.

10. A measurement arrangement according to claim 7, wherein:
    said measurement device is a level measurement device for measuring a level of a product in a container, in particular a time of flight microwave level measurement device, comprising an antenna, a guided radar time of flight level measurement device comprising a conductive probe, a capacitance level measurement device comprising a capacitance probe, or an ultrasonic level measurement device comprising an ultrasonic transducer.

11. A measurement arrangement according to claim 7, wherein:
    said measurement device is a level switch for monitoring a predetermined level of said product in a container, and
    said primary sensing element comprises a mechanically oscillating structure extending into said container at a height corresponding to said level to be monitored, and an electromechanical transducer for causing said structure to oscillate and for transforming a resulting oscillation of said structure into an electric measurement signal.

* * * * *